United States Patent
Aoshima

(10) Patent No.: US 12,316,781 B2
(45) Date of Patent: May 27, 2025

(54) PUBLIC KEY AUTHENTICATION DEVICE, PUBLIC KEY AUTHENTICATION SYSTEM, PUBLIC KEY AUTHENTICATION METHOD, AND PROGRAM

(71) Applicant: Nippon Telegraph and Telephone Corporation, Tokyo (JP)

(72) Inventor: Hiromu Aoshima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 337 days.

(21) Appl. No.: 17/802,434

(22) PCT Filed: Feb. 27, 2020

(86) PCT No.: PCT/JP2020/007929
§ 371 (c)(1),
(2) Date: Aug. 25, 2022

(87) PCT Pub. No.: WO2021/171456
PCT Pub. Date: Sep. 2, 2021

(65) Prior Publication Data
US 2023/0188363 A1 Jun. 15, 2023

(51) Int. Cl.
*H04L 29/00* (2006.01)
*H04L 9/30* (2006.01)
(Continued)

(52) U.S. Cl.
CPC .............. *H04L 9/3268* (2013.01); *H04L 9/30* (2013.01); *H04L 9/3247* (2013.01); *H04L 65/1069* (2013.01); *H04L 65/1104* (2022.05)

(58) Field of Classification Search
CPC ....... H04L 9/3268; H04L 9/30; H04L 9/3247; H04L 65/1069; H04L 65/1104; H04L 9/0662; H04L 65/1079; H04L 99/3268
See application file for complete search history.

(56) References Cited

U.S. PATENT DOCUMENTS 7,240,366 B2 * 7/2007 Buch .................. H04L 63/0823
713/153
8,929,521 B2 * 1/2015 Beyer ................. H04L 65/1073
379/120

(Continued)

OTHER PUBLICATIONS

[No Author Listed] [online], "IDG Information and Communication Series SIP Textbook," IDG Japan, Sep. 30, 2003, pp. 223-225, 13 pages (with English Translation).

*Primary Examiner* — Don G Zhao
(74) *Attorney, Agent, or Firm* — Fish & Richardson P.C.

(57) ABSTRACT

A device includes: a certificate check unit that, when a public key of a user A in a public key certificate stored in an IC card owned by the user A of a calling-side A telephone set using SIP is read and transmitted by the A telephone set and then received by a SIP server, checks validity of the public key certificate with an authentication server that authenticates the validity; a random number generation unit that generates a random number r when the validity is confirmed; and a signature verification unit that verifies that personal identity information on the user A in a DB is legitimate when a locked random number r, which is obtained by converting the random number r by using a private key kept in an IC card read by the A telephone set, is converted into the original random number r by using the public key.

9 Claims, 10 Drawing Sheets

(51) Int. Cl.
*H04L 9/32* (2006.01)
*H04L 65/1069* (2022.01)
*H04L 65/1104* (2022.01)

(56) References Cited

U.S. PATENT DOCUMENTS

| | | | | |
|---|---|---|---|---|
| 10,750,010 | B1* | 8/2020 | Fowler | H04L 65/1069 |
| 11,050,570 | B1* | 6/2021 | Totah | H04L 9/3215 |
| 2002/0106074 | A1* | 8/2002 | Elliott | H04M 19/041 |
| | | | | 379/372 |
| 2003/0217165 | A1* | 11/2003 | Buch | H04L 63/0823 |
| | | | | 709/229 |
| 2007/0186101 | A1* | 8/2007 | Rajko | H04L 67/147 |
| | | | | 713/161 |
| 2008/0046745 | A1* | 2/2008 | Buch | H04L 65/1104 |
| | | | | 713/176 |
| 2010/0146250 | A1* | 6/2010 | Bergerson | H04L 9/3268 |
| | | | | 713/1 |
| 2013/0036308 | A1* | 2/2013 | Buch | H04L 65/1101 |
| | | | | 713/171 |
| 2018/0324176 | A1* | 11/2018 | Campagna | H04L 63/0435 |
| 2018/0343127 | A1* | 11/2018 | Campagna | H04L 9/0825 |
| 2019/0313246 | A1* | 10/2019 | Nix | H04W 12/069 |
| 2021/0144004 | A1* | 5/2021 | Gray | H04L 9/14 |
| 2021/0184864 | A1* | 6/2021 | Wentz | H04L 9/3218 |
| 2021/0203656 | A1* | 7/2021 | Fowler | H04L 63/0823 |

\* cited by examiner

Fig. 6

| RECEIVING-SIDE TELEPHONE NUMBER | SERIAL NUMBER IN PUBLIC KEY CERTIFICATE | ACCEPTANCE/ REJECTION OF RECEIVING A CALL |
|---|---|---|
| #XXX (A) | C'S SERIAL NUMBER | ACCEPTANCE |
| | D'S SERIAL NUMBER | REJECTION |
| #YYY (B) | A'S SERIAL NUMBER | ACCEPTANCE |

| RECEIVING-SIDE TELEPHONE NUMBER | SERIAL NUMBER IN PUBLIC KEY CERTIFICATE | NOTIFICATION INFORMATION |
|---|---|---|
| #XXX (A) | C'S SERIAL NUMBER | &&& |
|  | D'S SERIAL NUMBER | $$$ |
| #YYY (B) | A'S SERIAL NUMBER | @@@ |

21g

PUBLIC KEY AUTHENTICATION DEVICE, PUBLIC KEY AUTHENTICATION SYSTEM, PUBLIC KEY AUTHENTICATION METHOD, AND PROGRAM

CROSS-REFERENCE TO RELATED APPLICATIONS

This application is a National Stage application under 35 U.S.C. § 371 of International Application No. PCT/JP2020/007929, having an International Filing Date of Feb. 27, 2020. The disclosure of the prior application is considered part of the disclosure of this application, and is incorporated by reference in its entirety into this application.

TECHNICAL FIELD

The present invention relates to a public key authentication device, a public key authentication system, a public key authentication method, and a program that make it possible to personally authenticate a participant in a telephone call by applying a public key authentication technology to a telephone system that uses voice calls over an IP (Internet Protocol) network.

BACKGROUND ART

When a voice call is made over the Internet, a protocol of SIP (Session Initiation Protocol) is applied to control the call (call control), such as making, receiving, and answering the call. In telephones using such SIP (hereinafter, referred to as SIP telephone), highly scalable telephone functionality is implemented, due to widespread use of IP and more sophisticated networks. Technologies of this type include one described in Non-Patent Literature 1.

CITATION LIST

Non-Patent Literature

Non-Patent Literature 1: Chimura et al., SIP textbook (IDG Information and Communication Series), pp. 223-225, IDG Japan, 2016.

SUMMARY OF THE INVENTION

Technical Problem

However, in SIP telephone sets and ordinary telephone sets, authenticity and traceability of responsibility, as elements of information security, are not implemented basically with respect to a call participant on (or a user of) the telephone. In other words, SIP telephone sets have a problem that a user cannot be personally authenticated. If a user cannot be personally authenticated, user identity theft is possible, and also, no log for identifying a user is left. Accordingly, users may suffer damage from phone frauds caused by identity theft, and detriment and loss such as from no-shows despite telephone reservations at restaurants, accommodations, and the like.

The present invention has been made in view of such circumstances, and an object of the present invention is to personally authenticate a user of a SIP telephone set that places a call.

Means for Solving the Problem

To solve the above problem, a public key authentication device of the present invention includes: a SIP server that connects a call between a calling-side telephone set using SIP (Session Initiation Protocol) and a receiving-side telephone set; a certificate check unit that, when a public key certificate stored in an IC (Integrated Circuit) card owned by a caller on the calling-side telephone set, the public key certificate including a public key and a serial number of the caller, is read and transmitted by the calling-side telephone set and then received by the SIP server, checks validity of the received public key certificate with an authentication server that authenticates the validity of the public key certificate; a random number generation unit that generates a random number when the validity is confirmed through the check; and a signature verification unit that receives a locked random number that is obtained at the calling-side telephone set by converting the random number by using a private key kept in the IC card, searches a DB (database) in which the serial number of and personal identity information on the caller are registered in advance in association with each other, when the received locked random number is converted into the original random number by using the public key, and verifies that the caller is legitimate when the personal identity information associated with the same serial number as the received serial number exists.

Effects of the Invention

According to the present invention, a user of a SIP telephone set that places a call can be personally authenticated.

BRIEF DESCRIPTION OF DRAWINGS

FIG. 6 is a table configuration diagram of a call placement permission determination list according to the application example 1.

FIG. 9 is a table configuration diagram of a call placement permission determination list according to the application example 2.

DESCRIPTION OF EMBODIMENTS

Hereinafter, embodiments of the present invention will be described with reference to drawings. Note that throughout the drawings in the present description, functionally corresponding components are denoted by the same reference signs, and a description thereof will be omitted as appropriate.

Configuration in Embodiment

Figure 1:
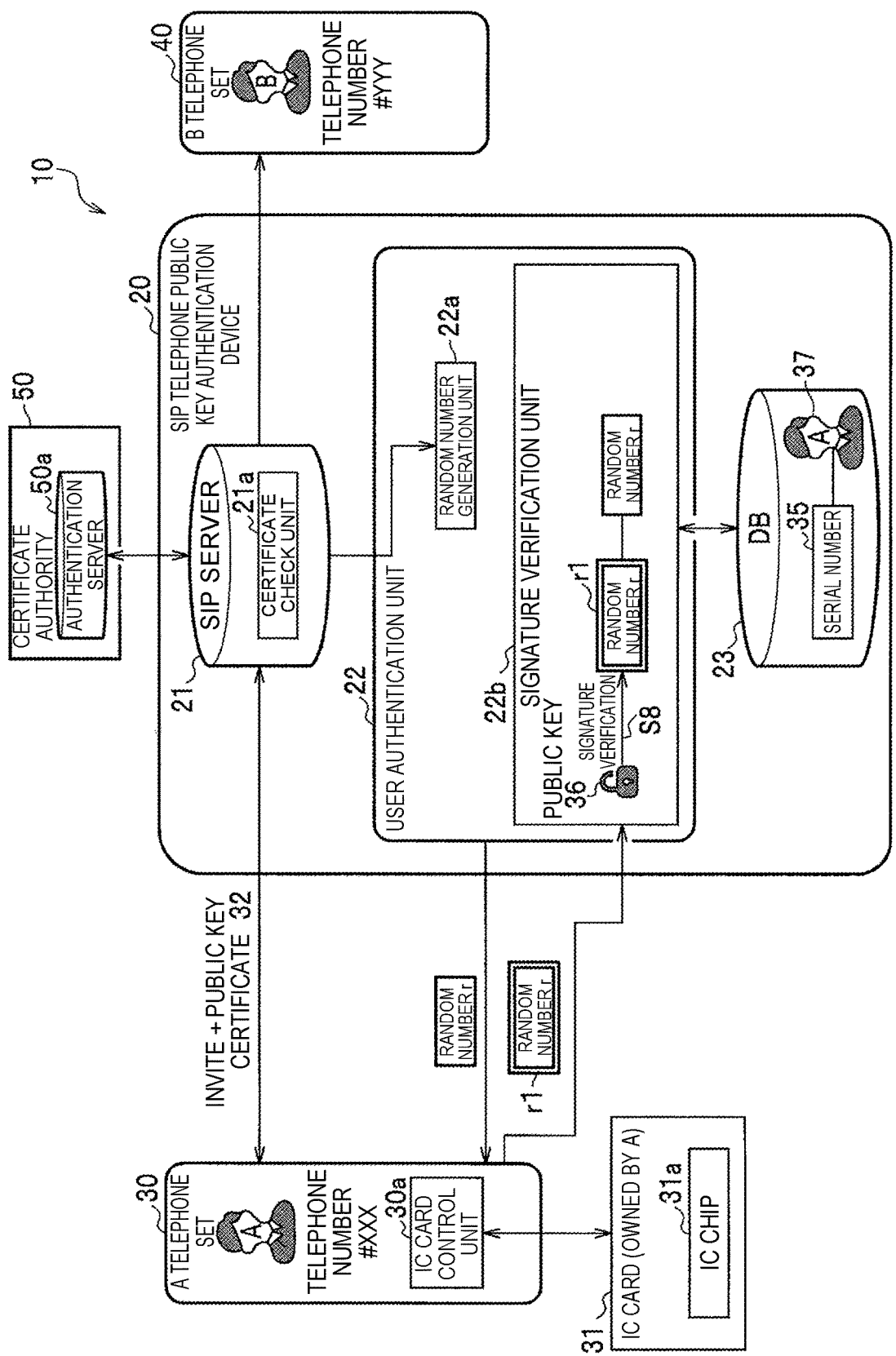
FIG. 1 is a block diagram showing a configuration of a SIP telephone public key authentication system using a SIP telephone public key authentication device according to an embodiment of the present invention.

FIG. 1 is a block diagram showing a configuration of a SIP telephone public key authentication system using a SIP telephone public key authentication device according to an embodiment of the present invention.

The SIP telephone public key authentication system (also referred to as the system) 10 shown in FIG. 1 includes the SIP telephone public key authentication device (also referred to as the authentication device) 20, an A telephone set 30 owned by a user A (caller) and a B telephone set 40 owned by a user B (call recipient) that are to participate in a telephone call, an IC (Integrated Circuit) card 31 owned by the user A, and a certificate authority 50. The A telephone set 30 constitutes a calling-side telephone set according to the claims which follow. The B telephone set 40 constitutes a receiving-side telephone set according to the claims which follow. The SIP telephone public key authentication system constitutes a public key authentication system according to the claims which follow. The SIP telephone public key authentication device constitutes a public key authentication device according to the claims which follow.

The A telephone set 30 is a SIP telephone set with a telephone number "#XXX". The A telephone set 30 carries out a telephone call with the B telephone set 40 via the authentication device 20, and includes an IC card control unit 30a. The IC card control unit 30a includes an RFID (Radio Frequency IDentification) function, and reads each information piece (which will be described later) recorded in, or writes information into, an IC chip 31a of an IC card 31 when the IC card 31 comes in contact with (or proximity to) an IC card reading portion of the A telephone set 30 and a predetermined passcode is entered from the A telephone set 30.

Figure 2:
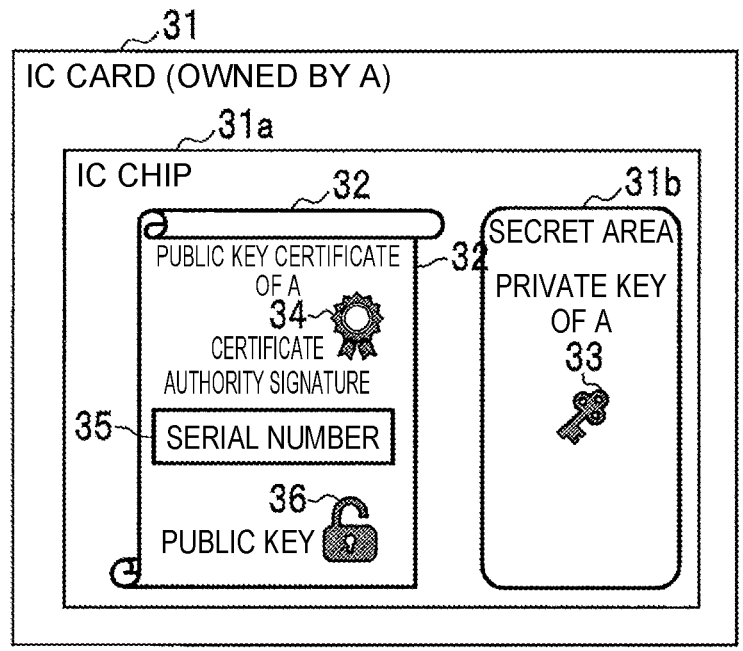
FIG. 2 is a block diagram showing a configuration of an IC card.

As shown in FIG. 2, information on a public key certificate (also referred to as a certificate) 32 of the user A, and information on a private key 33 of the user A, which is recorded in a secret area 31b, are stored in the IC chip 31a. Information on each of a serial number 35 and a public key 36 of the user A that are certified by a signature (certificate authority signature) 34 of the certificate authority is recorded in the public key certificate 32.

Referring back to FIG. 1, the A telephone set 30 transmits INVITE, which will be described later, and the public key certificate 32 to a SIP server 21 of the authentication device 20. INVITE is protocol information that is first transmitted in SIP to establish a session.

The B telephone set 40 is a SIP telephone set, or a telephone set of another device type, with a telephone number "#YYY". In other words, the B telephone set 40 may be a telephone set that can be used even if a facility between an exchange and the B telephone set 40 remains a metal line-based analog telephone facility.

The certificate authority 50 authenticates validity of the public key certificate 32 by using an authentication server 50a. Authentication information to perform the authentication can be held only by the certificate authority 50, and confidentially is kept only by the authentication server 50a.

The SIP telephone public key authentication device 20 performs processing of personally authenticating a user (for example, the user A) who places a call from a telephone set (for example, the A telephone set 30), and includes the SIP server 21, a user authentication unit 22, and a DB (database) 23. Note, however, that the SIP server 21 is a call connection unit according to the claims which follow that performs call connection processing for telephone sets. In the present embodiment, the call connection unit is the SIP server 21.

The SIP server 21 includes functionality for a telephone call between the A telephone set 30 using SIP and the B telephone set 40, performs recording and retrieval of a telephone number, an IP address, and the like, as well as management of an IP telephone service, and includes a certificate check unit 21a.

The certificate check unit 21a performs processing of checking validity of the public key certificate 32 received from the A telephone set 30 with the certificate authority 50. The certificate check unit 21a may be connected to an outside of the SIP server 21.

The user authentication unit 22 performs processing of authenticating the user A of the telephone set that places a call (for example, the A telephone set 30), and includes a random number generation unit 22a and a signature verification unit 22b.

The random number generation unit 22a generates a random number r when the certificate check unit 21a confirms (OKs) the certificate 32. The generated random number r is transmitted to the A telephone set 30. At the A telephone set 30, through control by the IC card control unit 30a, an electronic signature is attached to the received random number r by using the private key 33 (FIG. 2) in the IC card 31 made in contact with the A telephone set 30, and the random number r is thus converted into another random number. The random number obtained by the conversion is referred to as a locked random number r1. The locked random number r1 is returned to the authentication device 20.

When the locked random number r1 from the A telephone set 30 is received, the signature verification unit 22b performs signature verification on the locked random number r1 by using the public key 36 included in the certificate 32 received along with INVITE described above. The signature verification results in verification OK with the public key 36 that pairs with the private key 33 when the locked random number r1 is converted into the original random number r. As a result of the verification OK with the public key 36, the serial number 35 of the user A of the A telephone set 30 obtains OK.

The DB 23 stores in advance personal identity information 37 on a user of a telephone set and a serial number 35 unique to the user in association with each other. For example, the personal identity information 37 on the user A of the A telephone set 30 and the serial number 35 unique to the user A are stored in association with each other.

The user authentication unit 22 retrieves the serial number 35 of the user A that is verified as OK by the signature verification unit 22b from the DB 23, and authenticates the personal identity information 37 on the user A associated with the retrieved serial number 35 as OK. Through such authentication processing, the SIP server 21 enables a call connection between the user A and the other-end B telephone set 40.

Hardware Configuration

Figure 3:
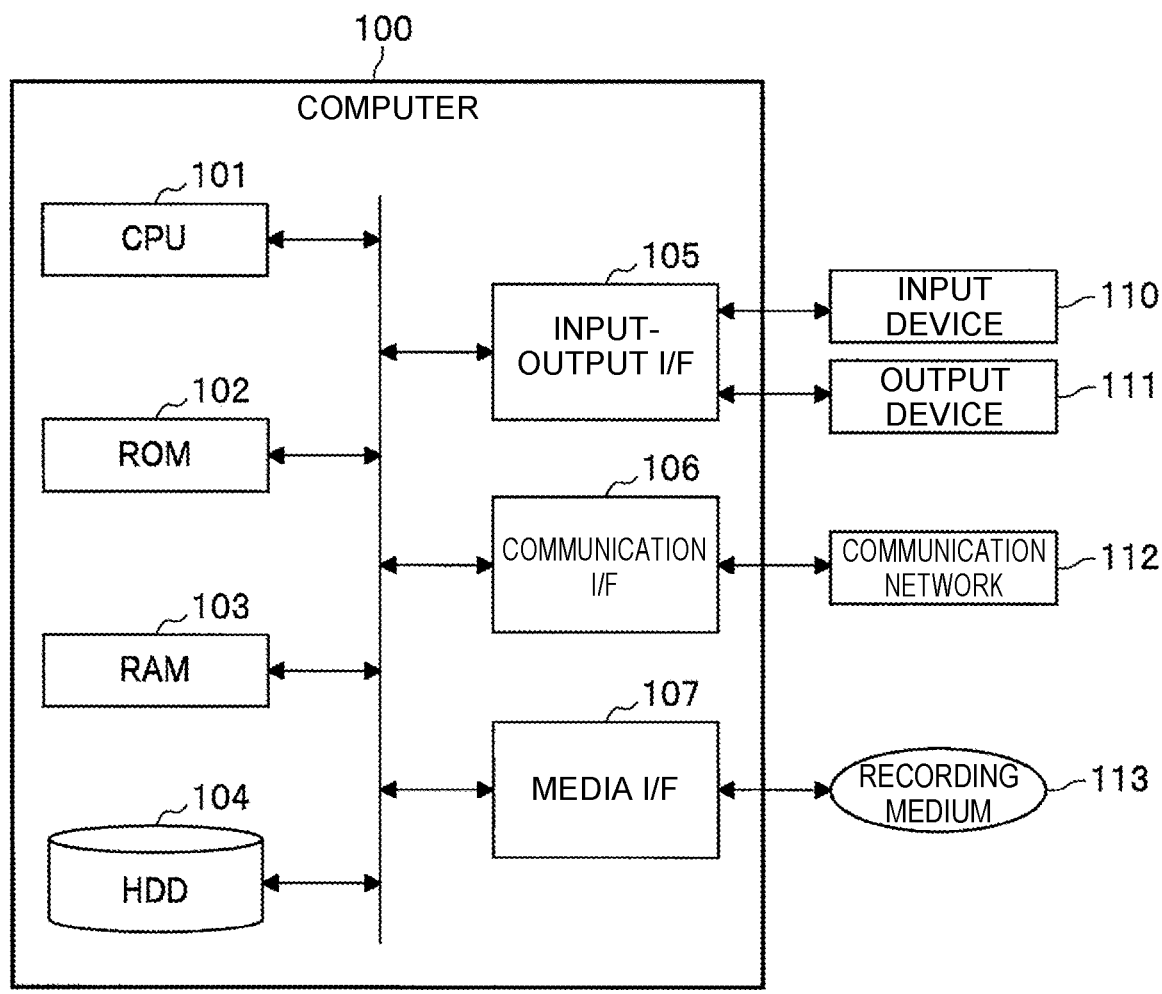
FIG. 3 is a hardware configuration diagram showing an example of a computer that implements functions of the SIP telephone public key authentication device.

The above-described SIP telephone public key authentication device 20 is implemented, for example, by a computer 100 having a configuration as shown in FIG. 3. The computer 100 includes a CPU (Central Processing Unit) 101, a ROM (Read Only Memory) 102, a RAM (Random Access Memory) 103, an HDD (Hard Disk Drive) 104, an input-output I/F (interface) 105, a communication I/F (interface) 106, and a media I/F 107.

The CPU 101 operates based on a program stored in the ROM 102 or the HDD 104, and controls each functional unit. The ROM 102 stores a boot program that is executed by the CPU 101 when the computer 100 is started, a program related to hardware of the computer 100, and the like.

The CPU 101 controls an output device 111 such as a printer or a display and an input device 110 such as a mouse or a keyboard via the input-output I/F 105. The CPU 101 acquires data from the input device 110 or outputs generated data to the output device 111 via the input-output I/F 105.

The HDD 104 stores a program executed by the CPU 101, data used by the program, and the like. The communication I/F 106 receives data from another undepicted device over a communication network 112 and outputs the data to the CPU 101, and transmits data generated by the CPU 101 to another device over the communication network 112.

The media I/F 107 reads a program or data stored in a recording medium 113, and outputs the program or the data to the CPU 101 via the RAM 103. The CPU 101 loads a program related to target processing from the recording medium 113 onto the RAM 103 via the media I/F 107, and executes the loaded program. The recording medium 113 is an optical recording medium such as DVD (Digital Versatile Disc) or PD (Phase change rewritable Disk), a magneto optical recording medium such as MO (Magneto Optical disk), a magnetic recording medium, a conductor memory tape medium, a semiconductor memory, or the like.

For example, when the computer 100 functions as the SIP telephone public key authentication device 20 according to the embodiment, the CPU 101 of the computer 100 implements functions of the SIP telephone public key authentication device 20 by executing the program loaded on the RAM 103. The HDD 104 stores data within the RAM 103. The CPU 101 reads from the recording medium 113 and executes a program related to target processing. In addition, the CPU 101 may read a program related to target processing from another device through the communication network 112.

Operation in Embodiment

Figure 4:
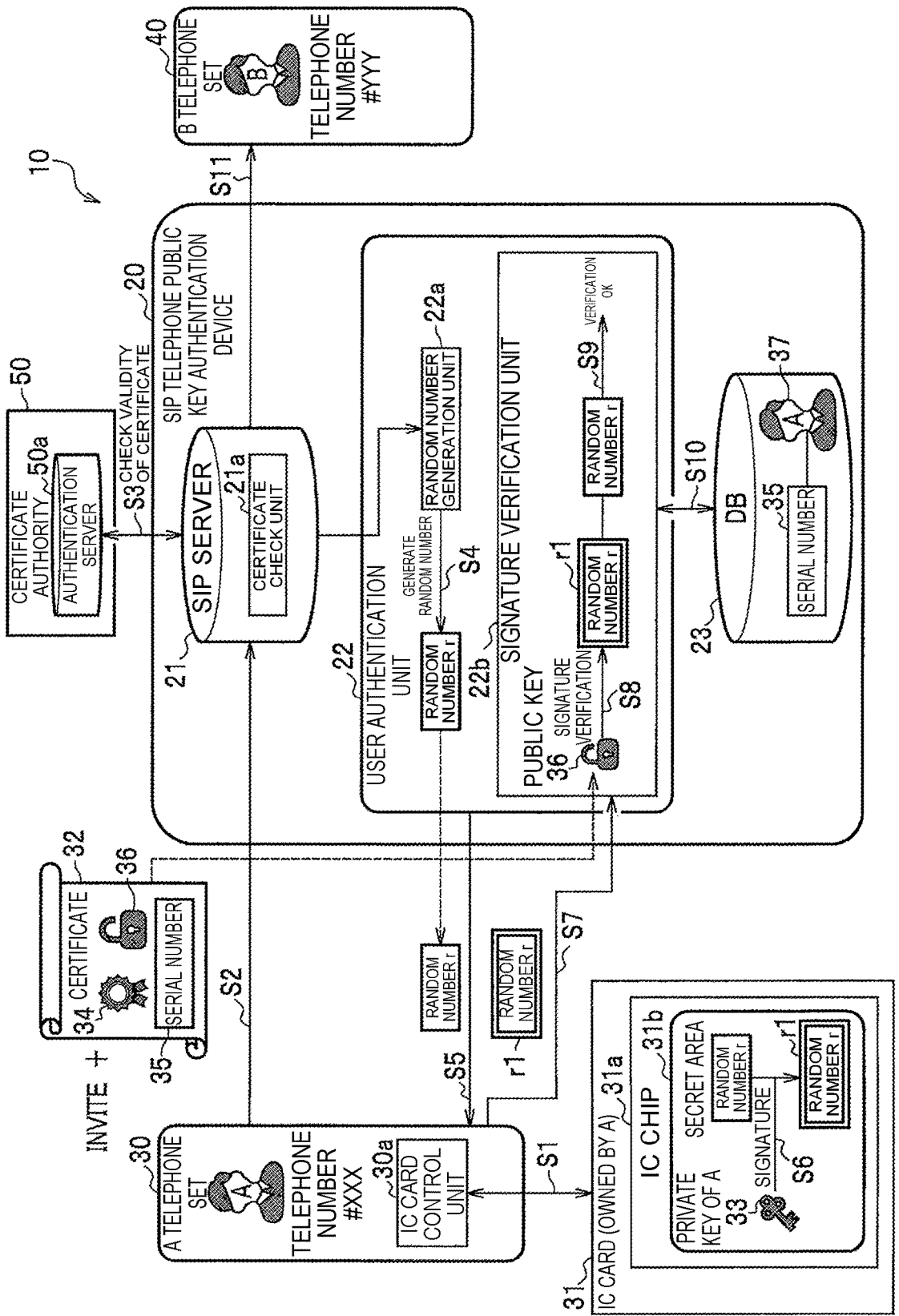
FIG. 4 is a block diagram describing a sequence of SIP telephone public key authentication operation in the SIP telephone public key authentication system according to the present embodiment.

Next, SIP telephone public key authentication operation in the SIP telephone public key authentication system 10 according to the present embodiment will be described with reference to a block diagram describing a sequence of the operation in FIG. 4. Note, however, that it is assumed that the personal identity information 37 on the user A of the A telephone set 30 and the serial number 35 unique to the user A are stored in association with each other in the DB 23 of the authentication device 20.

In step S1 shown in FIG. 3, when the IC card 31 is made in contact with the A telephone set 30 and a passcode is entered from the A telephone set 30 by the user A, the IC card control unit 30a reads the public key certificate 32 (FIG. 2) recorded in the IC chip 31a of the IC card 31. Information on each of the serial number 35 and the public key 36 of the user A that are certified by the certificate authority signature 34 is recorded in the public key certificate 32.

In step S2, the A telephone set 30 transmits INVITE and the public key certificate 32 read as described above to the SIP server 21 of the authentication device 20.

In step S3, the SIP server 21, by using the certificate check unit 21a, checks validity of the public key certificate 32 received from the A telephone set 30 with the certificate authority 50. Through the check processing, it is assumed that the validity of the public key certificate 32 is authenticated (authentication OK) by the authentication server 50a.

In step S4, the random number generation unit 22a that has received the authentication OK from the certificate check unit 21a generates a random number r. In step S5, the generated random number r is transmitted to the A telephone set 30.

In step S6, at the A telephone set 30, through control by the IC card control unit 30a, an electronic signature is attached to the received random number r by using the private key 33 in the IC card 31 shown in FIG. 2 that is made in contact with the A telephone set 30, and the random number r is thus converted into a locked random number r1. In step S7, the locked random number r1 is returned to the authentication device 20.

In step S8, when the locked random number r1 is received, the signature verification unit 22b of the authentication device 20 performs signature verification on the locked random number r1 by using the public key 36 included in the certificate 32 received in the step S2. In step S9, the signature verification results in verification OK with the public key 36 that pairs with the private key 33 when the locked random number r1 is converted into the original random number r. As a result of the verification OK with the public key 36, the serial number 35 of the user A of the A telephone set 30 obtains OK.

In step S10, the user authentication unit 22 retrieves the serial number 35 of the user A that is verified as OK in the step S9 from the DB 23, and authenticates the personal identity information 37 on the user A associated with the retrieved serial number 35 as OK. Through such authentication processing, in step S11, the SIP server 21 enables a call connection between the user A and the other-end B telephone set 40.

Effects of Embodiment

Effects of the SIP telephone public key authentication device 20 according to the embodiment as described above will be described.

The SIP telephone public key authentication device 20 includes the SIP server 21 that connects a call between the A telephone set 30 (calling-side telephone set) using SIP and the B telephone set 40 (receiving-side telephone set), the certificate check unit 21a, the random number generation unit 22a, the signature verification unit 22b, and the DB 23.

The certificate check unit 21a checks validity of the public key certificate 32 with the authentication server 50a of the certificate authority 50, which authenticates the validity, when the public key 36 of the user A in the public key certificate 32 stored in the IC card 31 owned by the user A who is the caller on the A telephone set 30, the public key 36 certified by the signature of the certificate authority 50, is read and transmitted by the A telephone set 30 and then received by the SIP server 21.

The random number generation unit 22a generates a random number r when the validity is confirmed through the check.

In the DB 23, a serial number of and personal identity information on a caller are registered in association with each other.

The signature verification unit 22b receives the random number r by using the private key 33 kept in the IC card 31 at the A telephone set 30, and, when the received locked random number r1 is converted into the original random number by using the public key 36, verifies that the caller is legitimate if the personal identity information 37 associated with the same serial number 35 as the received serial number 35 exists in the DB 23.

According to such a configuration, when the A telephone set 30 that is a SIP telephone set carries out a telephone call with the B telephone set 40, the user A of the calling-side A telephone set 30 can be personally authenticated. Accordingly, theft of the identity of the user A of telephone can be prevented, and a log of the user A can be left because the user A can be identified. Thus, damage from phone frauds caused by identity theft, and detriment and loss such as from no-shows despite telephone reservations at restaurants, accommodations, and the like can be prevented.

Further, versatility can be expanded: for example, such that a telephone call from a deliveryman who wishes to check in advance whether somebody is present at a delivery destination or the like can be answered by the user B at the delivery destination with no anxiety, and in teleworking or the like, management of connection to a telephone conference can be performed by authenticating participants, and therefore can be performed securely while confidentiality is maintained.

Application Example 1 of Embodiment

Figure 5:
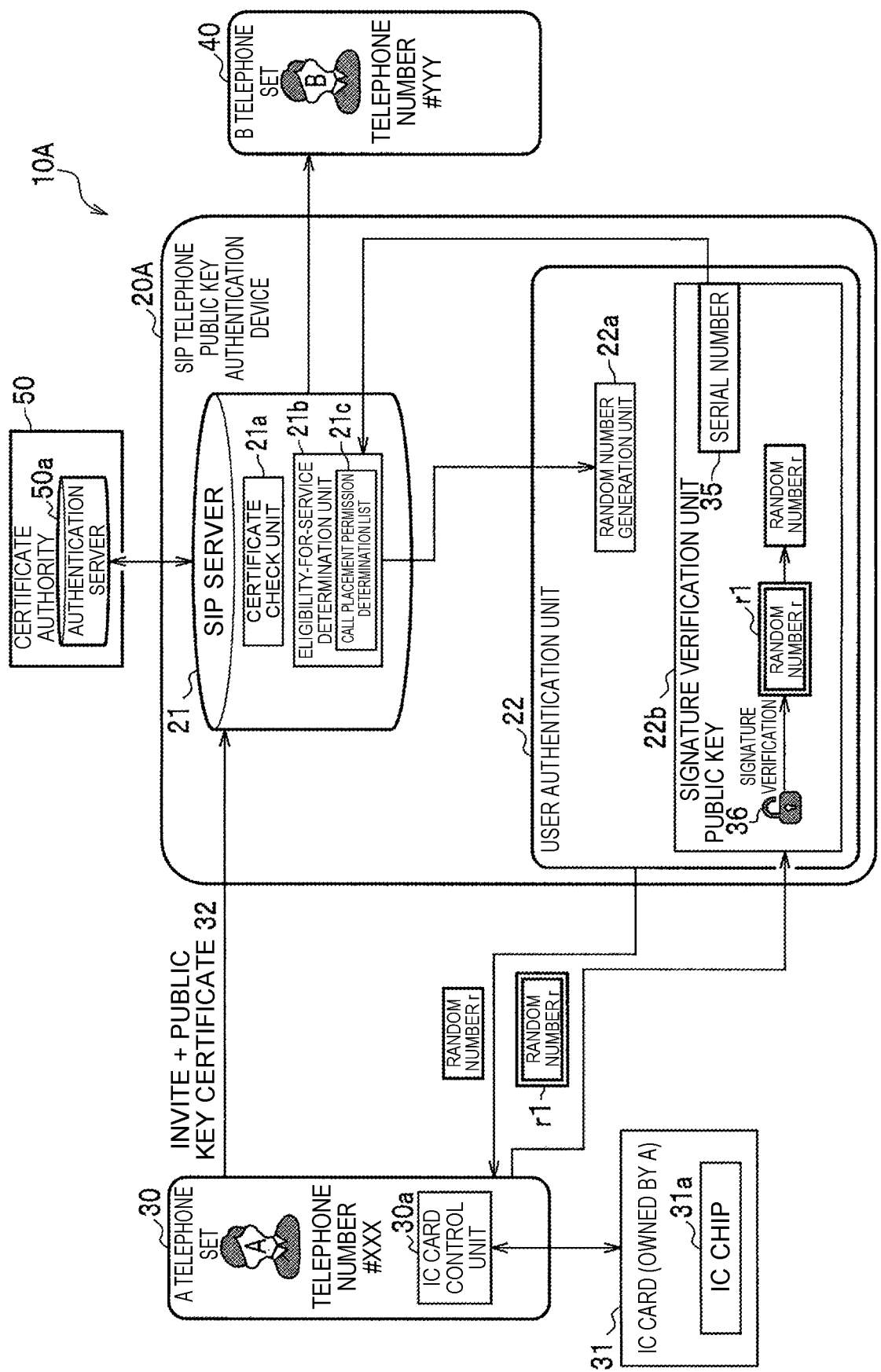
FIG. 5 is a block diagram showing a configuration of a SIP telephone public key authentication system using a SIP telephone public key authentication device according to an application example 1 of the present embodiment.

FIG. 5 is a block diagram showing a configuration of a SIP telephone public key authentication system using a SIP telephone public key authentication device according to an application example 1 of the embodiment of the present invention.

The SIP telephone public key authentication device 20A in the system 10A according to the application example 1 shown in FIG. 5 performs processing of authenticating a caller (user A) before a telephone call is carried out with a call recipient (user B).

A difference of the system 10A from the system 10 (FIG. 1) according to the above-described embodiment is that the SIP server 21 further includes an eligibility-for-service determination unit (also referred to as the determination unit) 21b that keeps a call placement permission determination list (also referred to as the list) 21c. The determination unit 21b keeping the list 21c may be connected to an outside of the SIP server 21. In the application example 1, the authentication device 20A does not include the DB 23 (FIG. 1).

As shown in FIG. 6, the call placement permission determination list 21c is configured in the form of a table in which a serial number in a public key certificate and information on acceptance/rejection of receiving a call are associated with a receiving-side telephone number. As an example, in a column of receiving-side telephone numbers, the telephone number "#XXX" of the A telephone set 30 and the telephone number "#YYY" of the B telephone set 40 are listed.

With "#XXX", caller "C's serial number" is associated, and "acceptance" of receiving a call is also associated. Further with "#XXX", caller "D's serial number" is associated, and "rejection" of receiving a call is also associated.

With "#YYY", caller "A's serial number" is associated, and "acceptance" of receiving a call is also associated.

When the SIP server 21 receives INVITE and the public key certificate 32, the eligibility-for-service determination unit 21b searches the list 21c and determines whether or not the serial number 35 stated in the received public key certificate 32 exists.

When the received serial number 35 exists, the certificate check unit 21a performs processing of checking validity of the public key certificate 32 received from the A telephone set 30 with the certificate authority 50.

When the serial number 35 of the user A is verified as OK as in the above-described embodiment, the signature verification unit 22b notifies the serial number 35 to the determination unit 21b. The determination unit 21b retrieves the notified serial number 35 of the user A from the list 21c (FIG. 6), and detects "acceptance" of receiving a call that is associated with the retrieved "A's serial number".

When the "acceptance" is detected, the determination unit 21b reads a receiving-side telephone number associated with the "A's serial number" in the list 21c, that is, the telephone number "#YYY" of the B telephone set 40. The SIP server 21 performs call connection to both the read "#YYY" and the telephone number "#XXX" of the calling-side telephone set that has transmitted the serial number 35, that is, the A telephone set 30, and thus enables a telephone call between the A telephone set 30 and the B telephone set 40.

Operation in Application Example 1

Next, SIP telephone public key authentication operation in the SIP telephone public key authentication system 10A according to the application example 1 will be described with reference to a block diagram describing a sequence of the operation in FIG. 7.

Figure 7:
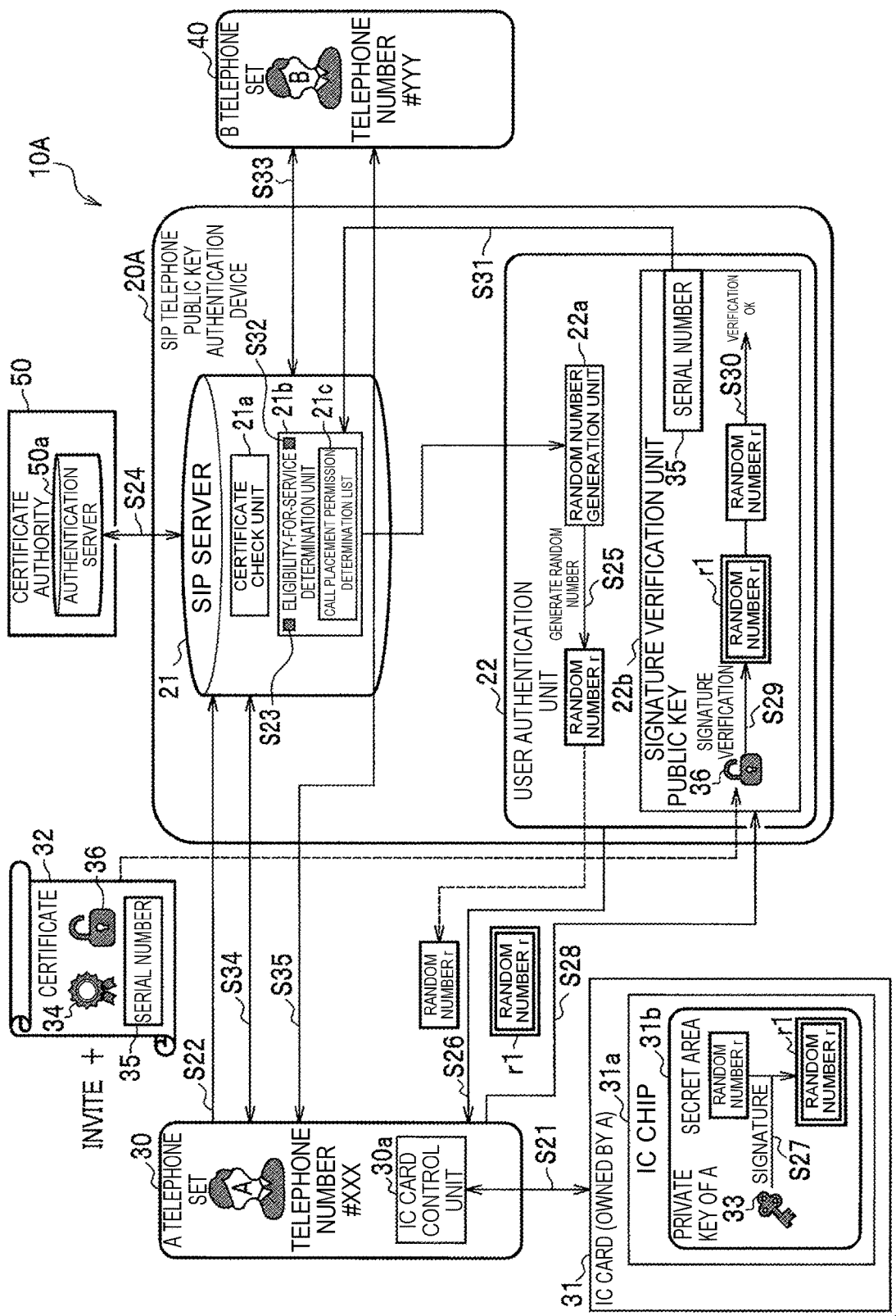
FIG. 7 is a block diagram describing a sequence of SIP telephone public key authentication operation in the SIP telephone public key authentication system according to the application example 1.

In step S21 shown in FIG. 7, when the IC card 31 is made in contact with the A telephone set 30 and a passcode is entered from the A telephone set 30 by the user A, the IC card control unit 30a reads the public key certificate 32 recorded in the IC chip 31a of the IC card 31. Information on each of the serial number 35 and the public key 36 of the user A shown in FIG. 2 that are certified by the certificate authority signature 34 is recorded in the public key certificate 32.

In step S22 in FIG. 7, the A telephone set 30 transmits INVITE and the public key certificate 32 read as described above to the SIP server 21 of the authentication device 20A.

In step S23, when the SIP server 21 receives the public key certificate 32, the determination unit 21b searches the list 21c (FIG. 6) and determines whether or not the serial number 35 stated in the received public key certificate 32 exists.

When a result of the determination is that the serial number 35 does not exist, the authentication processing is terminated, and the A telephone set 30 is unable to place a telephone call to the B telephone set 40.

When the serial number 35 exists, in step S24, the certificate check unit 21a performs processing of checking validity of the public key certificate 32 received from the A telephone set 30 with the authentication server 50a of the certificate authority 50. When the validity of the public key certificate 32 is not confirmed through the processing, the authentication processing is terminated, and the A telephone set 30 is unable to place a telephone call to the B telephone set 40.

When the validity of the public key certificate 32 is confirmed (authentication OK), in step S25, the random number generation unit 22a generates a random number r. In step S26, the generated random number r is transmitted to the A telephone set 30.

In step S27, at the A telephone set 30, through control by the IC card control unit 30a, an electronic signature is attached to the received random number r by using the private key 33 (FIG. 2), and the random number r is thus converted into a locked random number r1 in the IC card 31. In step S28, the locked random number r1 is returned to the authentication device 20.

In step S29, when the locked random number r1 is received, the signature verification unit 22b performs signature verification on the locked random number r1 by using the public key 36 included in the certificate 32 received in the step S22. In step S30, the signature verification results in verification OK with the public key 36 that pairs with the private key 33 when the locked random number r1 is converted into the original random number r. As a result of the verification OK with the public key 36, the serial number 35 of the user A of the A telephone set 30 obtains verification OK.

In step S31, the signature verification unit 22b notifies the serial number 35 obtaining the verification OK to the determination unit 21b.

In step S32, the determination unit 21b retrieves the notified serial number 35 of the user A from the list 21c (FIG. 6). When "A's serial number" is retrieved, the determination unit 21b detects "acceptance" of receiving a call associated with "A's serial number", and reads the telephone number "#YYY" of the receiving-side B telephone set 40 associated with "A's serial number".

In step S33, the SIP server 21 performs call connection to the B telephone set 40 with the read "#YYY". Further, in step S34, the SIP server 21 performs call connection to the calling-side A telephone set 30 that has transmitted the serial number 35. In step S35, the A telephone set 30 and the B telephone set 40 carry out a telephone call via the SIP server 21.

Effects of Application Example 1

Effects of the SIP telephone public key authentication device 20A according to the application example 1 of the embodiment as described above will be described.

The authentication device 20A includes the determination unit 21b. The determination unit 21b keeps the list 21c in which the serial number 35 of the user A of the A telephone set 30 (calling-side telephone set), the serial number 35 certified by the signature of the certificate authority 50 in the public key certificate 32, and acceptance or rejection of receiving a call are associated with the receiving-side telephone number "#YYY". When the SIP server 21 receives the public key 36 and the serial number 35 according to the public key certificate 32, the determination unit 21b determines whether or not the received serial number 35 exists in the list 21c.

It is assumed that after the determination unit 21b determines that the received serial number 35 exists, the signature verification unit 22b verifies that the serial number 35 is that of the caller A, and then "acceptance" of receiving a call associated with the verified serial number 35 is detected from the list 21c.

In such a case, the SIP server 21 is configured to perform call connection both to the telephone number "#YYY" of the B telephone set 40 for which acceptance is detected, and to the telephone number "#XXX" of the A telephone set 30 that has transmitted the serial number 35, and thus enables a telephone call between the telephone sets 30, 40 with the telephone numbers "#YYY", "#XXX".

According to such a configuration, before the user A of the calling-side A telephone set 30 carries out a telephone call with the user B of the receiving-side B telephone set 40, the calling-side user A can be automatically authenticated by the authentication device 20. Only when the authentication proves legitimacy, the authentication device 20 can enable the telephone call by performing call connection to both the calling-side A telephone set 30 and the receiving-side B telephone set 40.

Application Example 2 of Embodiment

Figure 8:
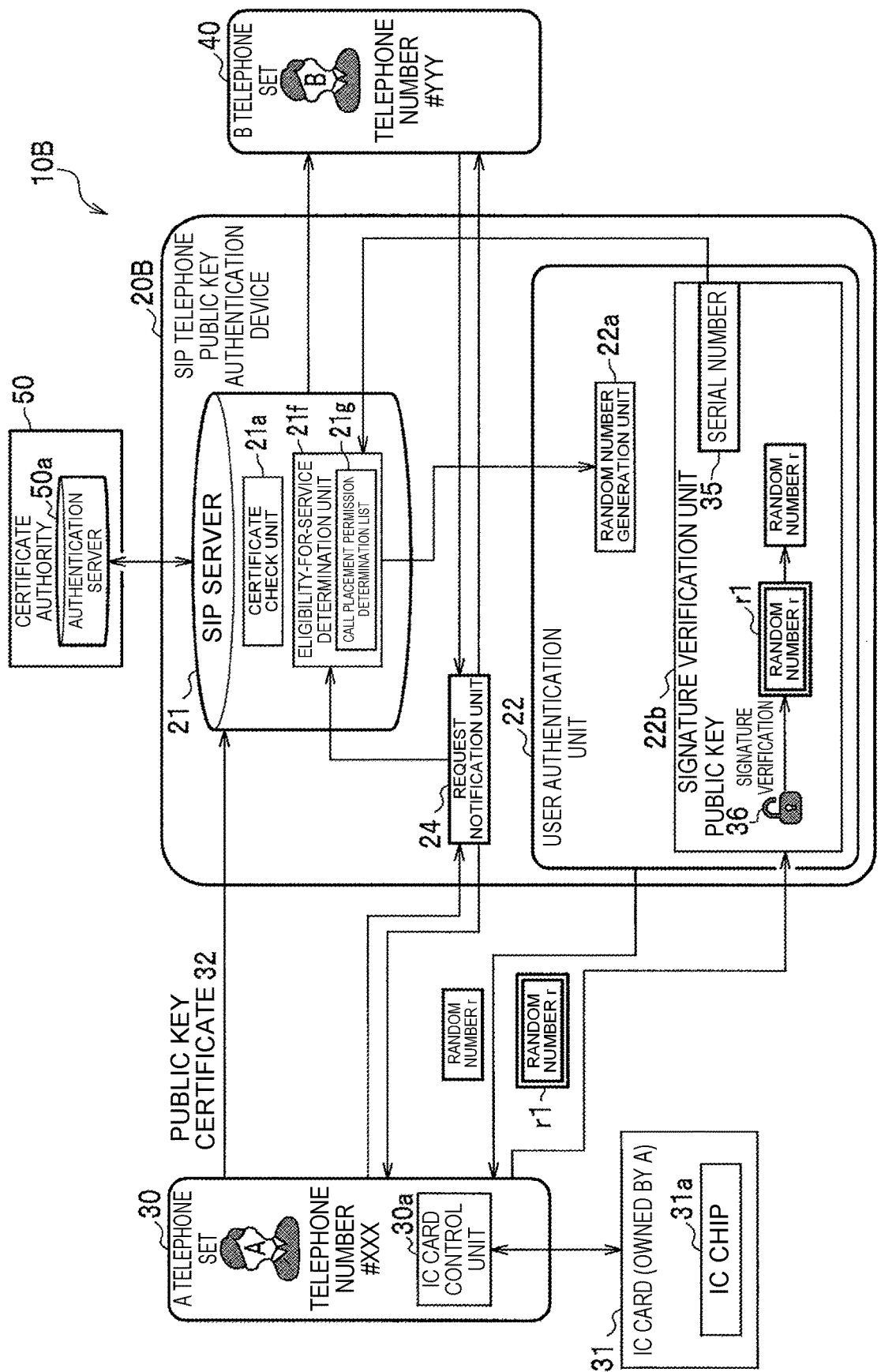
FIG. 8 is a block diagram showing a configuration of a SIP telephone public key authentication system using a SIP telephone public key authentication device according to an application example 2 of the present embodiment.

FIG. 8 is a block diagram showing a configuration of a SIP telephone public key authentication system using a SIP telephone public key authentication device according to an application example 2 of the embodiment of the present invention.

The SIP telephone public key authentication device 20B in the system 10B according to the application example 2 shown in FIG. 8 performs processing of authenticating a caller (user A) while a call recipient (user B) is carrying out a telephone call.

Differences of the system 10B according to the application example 2 from the system 10 (FIG. 5) according to the above-described application example 1 are that contents of the information included in a call placement permission determination list 21g in the SIP server 21 (which will be described later) and details of the processing performed by an eligibility-for-service determination unit 21f (which will be described later) are different, and that a request notification unit 24 is further included in the authentication device 20B. Note that the determination unit 21f that keeps the list 21g may be connected to an outside of the SIP server 21.

As shown in FIG. 9, the list 21g is configured in the form of a table in which a serial number in a public key certificate and notification information with which the calling-side user A can be personally identified are associated with a receiving-side telephone number. Note, however, that it is stated in the notification information whether or not the information is to be disclosed. As an example, in a column of receiving-side telephone numbers, the telephone number "#XXX" of the A telephone set 30 and the telephone number "#YYY" of the B telephone set 40 are listed.

With "#XXX", caller "C' serial number" is associated, and notification information "&&&" is also associated. Further with "#XXX", caller "D's serial number" is associated, and notification information "$$$" is also associated. With "#YYY", caller "A's serial number" is associated, and notification information "@@@" is also associated.

When a request for authentication of the user A is made at the B telephone set 40 through an operation for requesting authentication of the user A of the A telephone set 30 during a telephone call between the calling-side A telephone set 30 and the receiving-side B telephone set 40, the request notification unit 24 notifies the request for authentication to the determination unit 21f. However, there are some cases where the user A of the calling-side A telephone set 30 makes a request for authentication of him/herself (user A).

The determination unit 21f checks whether or not the telephone number "#XXX" of the B telephone set 40 that has made the request for authentication is registered in the list 21g. In other words, it is checked whether or not the user B is eligible for the present authentication service.

When the telephone number "#XXX" of the B telephone set 40 is registered in the list 21g, the request notification unit 24 requests the calling-side A telephone set 30 to transmit the public key certificate 32. When the public key certificate 32 is transmitted from the A telephone set 30 in response to the request, the public key certificate 32 is received by the SIP server 21.

When the public key certificate 32 is received by the SIP server 21, the determination unit 21*f* searches the list 21*g* and determines whether or not the serial number 35 stated in the public key certificate 32 exists in the list 21*g*.

Moreover, when the serial number 35 of the user A is notified from the signature verification unit 22*b* as in the above-described application example 1, the determination unit 21*f* checks whether or not the notification information "@@@" further associated with the user "A's serial number" associated with the telephone number "#YYY" of the receiving-side user B in the list 21*g* is to be disclosed.

When a result of the check finds that the notification information "@@@" is to be disclosed, the request notification unit 24 notifies the notification information "@@@" in the list 21*g*, as a result of the authentication, to the receiving-side B telephone set 40. The B telephone set 40 that has received the notification displays on a display, or narrates with voice, the calling-side user A, as a content of the notification information "@@@", in a personally identifiable manner.

Operation in Application Example 2

Next, SIP telephone public key authentication operation in the SIP telephone public key authentication system 10B according to the application example 2 will be described with reference to a block diagram describing a sequence of the operation in FIG. 10.

Figure 10:
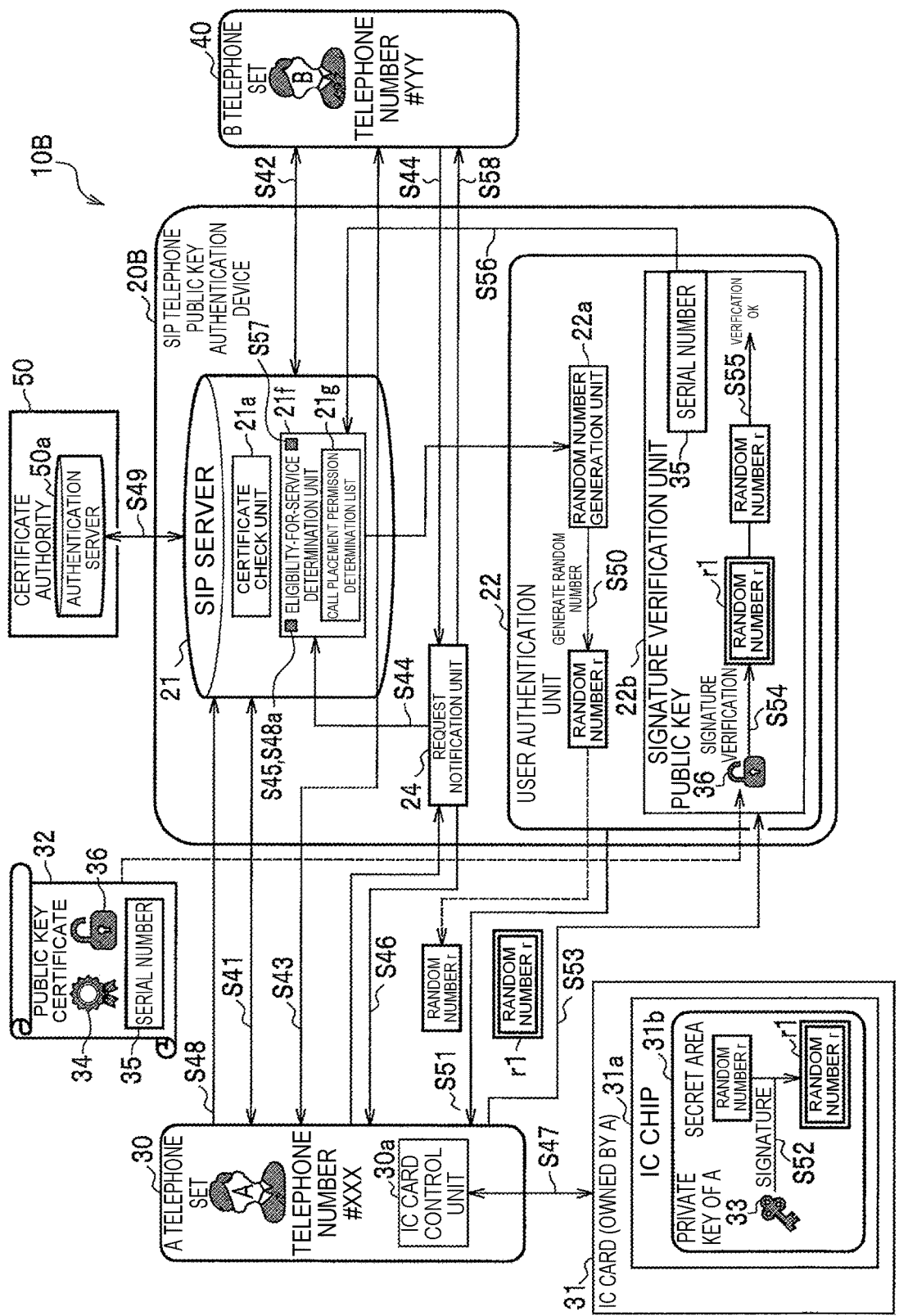
FIG. 10 is a block diagram describing a sequence of SIP telephone public key authentication operation in the SIP telephone public key authentication system according to the application example 2.

In step S41 shown in FIG. 10, when the user A places a call from the A telephone set 30 to the call-destination B telephone set 40, the SIP server 21 performs call connection to the A telephone set 30, and in step S42, further performs call connection to the B telephone set 40. Thus, in step S43, a telephone call is enabled between the A telephone set 30 and the B telephone set 40.

During the telephone call, when the user B performs an operation, on the B telephone set 40, for requesting authentication of the user A of the A telephone set 30, in step S44, the request for authentication of the user A is notified from the request notification unit 24 to the determination unit 21*f*.

In step S45, the determination unit 21*f* checks whether or not the telephone number "#XXX" of the B telephone set 40 that is the source of the notified request for authentication is registered in the list 21*g*.

When the telephone number "#XXX" of the B telephone set 40 is registered in the list 21*g*, in step S46, the request notification unit 24 makes a request, to the calling-side A telephone set 30, for transmission of the public key certificate 32.

When the request is notified to the A telephone set 30, in step S47, the user A makes the IC card 31 in contact with the A telephone set 30. Due to the contact, the IC card control unit 30*a* reads the public key certificate 32 recorded in the IC chip 31*a* of the IC card 31.

In step S48, the A telephone set 30 transmits the read public key certificate 32 back to the SIP server 21.

When the public key certificate 32 is received by the SIP server 21, in step S48*a*, the determination unit 21*f* searches the list 21*g* and determines whether or not the serial number 35 stated in the received public key certificate 32 exists in the list 21*g*.

When a result of the determination is that the serial number 35 does not exist, the authentication processing is terminated. The fact that the authentication processing is unable to be performed is notified to the receiving-side B telephone set 40.

When the serial number 35 exists, in step S49, the certificate check unit 21*a* checks validity of the public key certificate 32 received from the A telephone set 30 with the authentication server 50*a* of the certificate authority 50. When the validity of the public key certificate 32 is not confirmed through the check, the authentication processing is terminated, and the fact that the authentication processing is unable to be performed is notified to the receiving-side B telephone set 40.

When the validity of the public key certificate 32 is confirmed (authentication OK), in step S50, the random number generation unit 22*a* generates a random number r. In step S51, the generated random number r is transmitted to the A telephone set 30.

In step S52, at the A telephone set 30, through control by the IC card control unit 30*a*, the received random number r is converted into a locked random number r1 by using the private key 33 (FIG. 2) in the IC card 31. The locked random number r1 is returned to the authentication device 20 in step S53.

In step S54, when the locked random number r1 is received, the signature verification unit 22*b* of the authentication device 20B performs signature verification on the locked random number r1 by using the public key 36 included in the certificate 32 received in the step S48. When the locked random number r1 is converted into the original random number r, in step S55, the signature verification results in verification OK with the public key 36, so that the serial number 35 of the user A obtains OK.

In step S56, the signature verification unit 22*b* notifies the serial number 35 verified as OK to the determination unit 21*f*.

In step S57, the determination unit 21*f* retrieves the notified serial number 35 of the user A from the list 21*g* (FIG. 9), and checks whether or not the notification information "@@@" associated with the user "A's serial number" associated with the retrieved "A's serial number" is to be disclosed.

When a result of the check finds that the notification information "@@@" is to be disclosed, in step S58, the request notification unit 24 notifies the notification information "@@@" to be disclosed, to the receiving-side B telephone set 40. The B telephone set 40 that has received the notification displays on a display, or narrates with voice, the calling-side user A as a content of the notification information "@@@" in a personally identifiable manner. Thus, the receiving-side user B can recognize the calling-side user A as a legitimate caller.

Effects of Application Example 2

Effects of the SIP telephone public key authentication device 20B according to the embodiment as described above will be described.

The authentication device 20B further includes the request notification unit 24 and the determination unit 21*f* that keeps the list 21*g*.

The request notification unit 24 performs processing of receiving a request for authentication of the caller on the A telephone set 30 from the B telephone set 40 during a telephone call, processing of making a request, to the A telephone set 30, for transmission of the public key certificate, and processing of notifying a result of the request for authentication to the B telephone set 40.

The determination unit 21f keeps the list 21g in which the serial number 35 of the user A who is the caller, the serial number 35 certified by the signature of the certificate authority in the public key certificate 32, and the notification information with which the user A can be identified are associated with the receiving-side telephone number "#YYY". The determination unit 21f determines whether or not the telephone number "#YYY" of the B telephone set 40 is registered in the list 21g when the request notification unit 24 receives the request for authentication, and determines whether or not the received serial number 35 exists in the list 21g when the SIP server 21 receives the public key and the serial number 35 according to the public key certificate 32.

When the determination unit 21f determines that the telephone number of the B telephone set 40 is registered in the list 21g, the request notification unit 24 makes a request, to the A telephone set 30, for transmission of the public key certificate 32. After the determination unit 21f determines that the serial number 35 according to the public key certificate 32 transmitted back from the A telephone set 30 in response to the request for transmission exists in the list 21g, the signature verification unit 22b verifies that the serial number 35 is legitimate.

After the verification, when the determination unit 21f determines from the list 21g that the notification information associated with the verified serial number 35 is to be disclosed, the request notification unit 24 is configured to notify the notification information, as the result of the request for authentication, to the B telephone set 40.

According to such a configuration, while the call recipient B on the B telephone set 40 is carrying out a telephone call, the caller A on the A telephone set 30 can be authenticated, and a result thereof can be notified to the call recipient B.

Program

Next, a program executed by a computer according to the embodiment will be described. The computer is assumed to be the SIP telephone public key authentication device 20 that makes it possible to personally authenticate a participant in a telephone call, by applying the SIP server 21 that connects a call between the A telephone set 30 (calling-side telephone set) using SIP and the B telephone set 40 (receiving-side telephone set).

The program causes the computer to function as three means as follows. A first one is means for checking validity of a received public key certificate 32 with the authentication server 50a that authenticates the validity of the public key certificate 32 when the public key certificate 32 stored in the IC card 31 owned by the caller A on (user A of) the A telephone set 30, the public key certificate 32 including the public key 36 and the serial number 35 of the caller A, is read and transmitted by the A telephone set 30 and then received by the SIP server 21. A second one is means for generating a random number r when the validity is confirmed through the check. A third one is means for receiving a locked random number r that is obtained at the A telephone set 30 by converting the random number r by using the private key 36 kept in the IC card 31, for searching the DB 23 in which the serial number 35 of and the personal identity information 37 on the caller A are registered in advance in association with each other, when the received locked random number r is converted into the original random number r by using the public key, and for verifying that the caller A is legitimate when the personal identity information 37 associated with the same serial number 35 as the received serial number 35 exists.

According to the program, effects similar to those of the SIP telephone public key authentication device 20 described above can be obtained.

Effects (1) A public key authentication device including: a call connection unit that connects a call between a calling-side telephone set using SIP (Session Initiation Protocol) and a receiving-side telephone set; a certificate check unit that, when a public key certificate stored in an IC (Integrated Circuit) card owned by a caller on the calling-side telephone set, the public key certificate including a public key and a serial number of the caller, is read and transmitted by the calling-side telephone set and then received by the call connection unit, checks validity of the received public key certificate with an authentication server that authenticates the validity of the public key certificate; a random number generation unit that generates a random number when the validity is confirmed through the check; and a signature verification unit that receives a locked random number that is obtained at the calling-side telephone set by converting the random number by using a private key kept in the IC card, searches a DB (database) in which the serial number of and personal identity information on the caller are registered in advance in association with each other, when the received locked random number is converted into the original random number by using the public key, and verifies that the caller is legitimate when the personal identity information associated with the same serial number as the received serial number exists.

According to such a configuration, when a calling-side telephone set that is a SIP telephone set carries out a telephone call with a receiving-side telephone set, a caller on the calling-side telephone set can be personally authenticated. In other words, a caller on a SIP telephone set that places a call can be personally authenticated. Accordingly, theft of an identity of a telephone caller can be prevented, and a log of the caller can be left because the caller can be identified. Thus, damage from phone frauds caused by identity theft, and detriment and loss such as from no-shows despite telephone reservations at restaurants, accommodations, and the like can be prevented.

(2) The public key authentication device according to (1) above, further including a determination unit that keeps a list in which a serial number in a public key certificate including a public key and the serial number of a caller, and acceptance or rejection of receiving a call are associated with a receiving-side telephone number, and determines whether or not the received serial number exists in the list when the call connection unit receives the public key and the serial number in the public key certificate from the calling-side telephone set, wherein after it is determined by the determination unit that the received serial number exists in the list, the signature verification unit verifies that the serial number is of the caller, and when the acceptance of receiving a call associated with the verified serial number is detected from the list, the call connection unit performs call connection to both a telephone number of the receiving-side telephone set associated with the detected acceptance of receiving a call and a telephone number of the calling-side telephone set that has transmitted the serial number, and thus enables a telephone call between the telephone sets with the telephone numbers.

According to such a configuration, before a caller on a calling-side telephone set carries out a telephone call with a user of a receiving-side telephone set, the caller can be automatically authenticated by the authentication device. Only when the authentication proves legitimacy, the authentication device can enable the telephone call by performing call connection to both the calling-side and receiving-side telephone sets.

(3) The public key authentication device according to (1) above, further including: a request notification unit that performs processing of receiving a request for authentication of the caller on the calling-side telephone set from the receiving-side telephone set during a telephone call, processing of making a request, to the calling-side telephone set, for transmission of the public key certificate including the public key and the serial number of the caller, and processing of notifying a result of the request for authentication to the receiving-side telephone set; and a determination unit that keeps a list in which the serial number of the caller in the public key certificate, and notification information with which the caller can be identified are associated with a receiving-side telephone number, determines whether or not a recipient telephone number of the receiving-side telephone set is registered in the list when the request notification unit receives the request for authentication, and determines whether or not the received serial number exists in the list when the call connection unit receives the public key and the serial number according to the public key certificate, wherein when it is determined by the determination unit that the recipient telephone number is registered in the list, the request notification unit makes the request, to the calling-side telephone set, for transmission of the public key certificate, and after it is determined by the determination unit that the serial number according to the public key certificate transmitted back from the calling-side telephone set in response to the request for transmission exists in the list, the signature verification unit verifies that the serial number is of the caller, and when it is determined by the determination unit that the notification information associated with the serial number is to be disclosed, the request notification unit notifies the notification information, as the result of the request for authentication, to the receiving-side telephone set.

According to such a configuration, while a call recipient on a receiving-side telephone set is carrying out a telephone call, a caller on a calling-side telephone set can be automatically authenticated by the authentication device, and a result thereof can be notified to the call recipient.

(4) A public key authentication system including: a calling-side telephone set using SIP; a receiving-side telephone set to which the calling-side telephone set is call-connected; and the public key authentication device according to any one of (1) to (3) above.

According to such a configuration, effects similar to those of the public key authentication device according to any one of (1) to (3) above can be obtained.

(5) A public key authentication method performed by a public key authentication device that makes it possible to personally authenticate a caller by using a call connection unit that connects a call between a calling-side telephone set using SIP and a receiving-side telephone set, including: by the public key authentication device, when a public key certificate stored in an IC card owned by the caller on the calling-side telephone set, the public key certificate including a public key and a serial number of the caller, is read and transmitted by the calling-side telephone set and then received by the call connection unit, checking validity of the received public key certificate with an authentication server that authenticates the validity of the public key certificate; generating a random number when the validity is confirmed through the checking; and receiving a locked random number that is obtained at the calling-side telephone set by converting the random number by using a private key kept in the IC card, searching a DB in which the serial number of and personal identity information on the caller are registered in advance in association with each other, when the received locked random number is converted into the original random number by using the public key, and verifying that the caller is legitimate when the personal identity information associated with the same serial number as the received serial number exists.

According to such a method, effects similar to those of the public key authentication device according to (1) above can be obtained.

(6) A program for causing a computer to function as the public key authentication device according to any one of (1) to (3) above.

According to such a program, effects similar to those of the public key authentication device according to any one of (1) to (3) above can be obtained.

In addition, changes may be made for specific configurations as appropriate within a scope that does not depart from the gist of the present invention.

REFERENCE SIGNS LIST 10, 10A, 10B SIP telephone public key authentication system (public key authentication system)
20, 20A, 20B SIP telephone public key authentication device (public key authentication device)
21 Call connection unit
21a Certificate check unit
21b, 21f Eligibility-for-service determination unit
21c, 21g Call placement permission determination list
22 User authentication unit
22a Random number generation unit
22b Signature verification unit
23 DB
30 A telephone set
30a IC card control unit
31 IC card
31a IC chip
32 Public key certificate
33 Private key
34 Certificate authority signature
35 Serial number
36 Public key
37 Personal identity information
40 B telephone set
50 Certificate authority
50a Authentication server

The invention claimed is:

1. A public key authentication device comprising one or more processors and memory storing one or more instructions, which when executed by the one or more processors, causes the one or more processors to perform operations comprising:

receiving, from a calling-side telephone set, an invitation requesting for connecting to a receiving-side telephone set using Session Initiation Protocol (SIP) and a public key certificate stored in an Integrated Circuit (IC) card associated with a caller of the calling-side telephone set, wherein the public key certificate includes a public key and a serial number of the caller;

checking validity of the received public key certificate with an authentication server configured to authenticate the validity of the public key certificate;

generating a random number in response to confirmation of the validity;

transmitting the random number to the calling-side telephone set;

receiving a locked random number from the calling-side telephone set by attaching an electronic signature to the random number using a private key stored in the IC card, wherein the private key is paired with the public key;

performing a signature verification on the locked random number using the public key to convert the locked random number back to the random number;

search a database (DB) for the serial number of the caller, wherein the serial number is associated with personal identity information of the caller;

verifying that the caller is legitimate by authenticating the personal identity information; and enabling a telephone call connection between the calling-side telephone set and the receiving-side telephone set.

2. The public key authentication device according to claim 1, the operations further comprising:

providing a list including at least one receiving-side telephone number, one or more serial numbers of different callers associated with the at least one receiving-side telephone number, and acceptance or rejection of receiving a telephone call associated with each serial number;

determining whether or not the received serial number in the received public key certificate is in the list;

in response to determining that the received serial number is in the list, detecting the acceptance of receiving a telephone call associated with the received serial number from the list; and in response to detecting the acceptance of receiving the telephone call, obtaining a receiving-side telephone number associated with the received serial number from the list.

3. The public key authentication device according to claim 1, further comprising:

receiving, from the receiving-side telephone set, a request for authentication of the caller during the telephone call;

providing a list including at least one receiving-side telephone number, one or more serial numbers of different callers associated with the at least one receiving-side telephone number, and notification information associated with each serial number;

determining whether or not a receiving-side telephone number of the receiving-side telephone set is in the list;

in response to determining that the receiving-side telephone number is in the list, determining whether or not the received serial number in the received public key certificate is in the list;

in response to determining that the received serial number is in the list, identifying notification information associated with the received serial number; and transmitting the notification information, as the result of the request for authentication, to the receiving-side telephone set.

4. A public key authentication method performed by a public key authentication device configured to personally authenticate a caller, comprising:

receiving, from a calling-side telephone set, an invitation requesting for connecting to a receiving-side telephone set using Session Initiation Protocol (SIP) and a public key certificate stored in an Integrated Circuit (IC) card associated with a caller of the calling-side telephone set, wherein the public key certificate includes a public key and a serial number of the caller;

checking validity of the received public key certificate with an authentication server configured to authenticate the validity of the public key certificate;

generating a random number in response to confirmation of the validity;

transmitting the random number to the calling-side telephone set;

receiving a locked random number from the calling-side telephone set by attaching an electronic signature to the random number using a private key stored in the IC card, wherein the private key is paired with the public key;

performing a signature verification on the locked random number using the public key to convert the locked random number back to the random number;

search a database (DB) for the serial number of the caller, wherein the serial number is associated with personal identity information of the caller;

verifying that the caller is legitimate by authenticating the personal identity information; and enabling a telephone call connection between the calling-side telephone set and the receiving-side telephone set.

5. A non-transitory computer readable medium storing one or more instructions causing a computer to function as a public key authentication device to execute:

receiving, from a calling-side telephone set, an invitation requesting for connecting to a receiving-side telephone set using Session Initiation Protocol (SIP) and a public key certificate stored in an Integrated Circuit (IC) card associated with a caller of the calling-side telephone set, wherein the public key certificate includes a public key and a serial number of the caller;

checking validity of the received public key certificate with an authentication server configured to authenticate the validity of the public key certificate;

generating a random number in response to confirmation of the validity;

transmitting the random number to the calling-side telephone set;

receiving a locked random number from the calling-side telephone set by attaching an electronic signature to the random number using a private key stored in the IC card, wherein the private key is paired with the public key;

performing a signature verification on the locked random number using the public key to convert the locked random number back to the random number;

search a database (DB) for the serial number of the caller, wherein the serial number is associated with personal identity information of the caller;

verifying that the caller is legitimate by authenticating the personal identity information; and enabling a telephone call connection between the calling-side telephone set and the receiving-side telephone set.

6. The public key authentication method according to claim 4, further comprising:

providing a list including at least one receiving-side telephone number, one or more serial numbers of different callers associated with the at least one receiving-side telephone number, and acceptance or rejection of receiving a telephone call associated with each serial number;

determining whether or not the received serial number in the received public key certificate is in the list;

in response to determining that the received serial number is in the list, detecting the acceptance of receiving a telephone call associated with the received serial number from the list; and in response to detecting the acceptance of receiving the telephone call, obtaining a receiving-side telephone number associated with the received serial number from the list.

7. The public key authentication method according to claim 4, further comprising:

receiving, from the receiving-side telephone set, a request for authentication of the caller during the telephone call;

providing a list including at least one receiving-side telephone number, one or more serial numbers of different callers associated with the at least one receiving-side telephone number, and notification information associated with each serial number;

determining whether or not a receiving-side telephone number of the receiving-side telephone set is in the list;

in response to determining that the receiving-side telephone number is in the list, determining whether or not the received serial number in the received public key certificate is in the list;

in response to determining that the received serial number is in the list, identifying notification information associated with the received serial number; and transmitting the notification information, as the result of the request for authentication, to the receiving-side telephone set.

8. The non-transitory computer readable medium according to claim 5, wherein the one or more instructions further cause the computer to execute:

providing a list including at least one receiving-side telephone number, one or more serial numbers of different callers associated with the at least one receiving-side telephone number, and acceptance or rejection of receiving a telephone call associated with each serial number; and determining whether or not the received serial number is in the list;

in response to determining that the received serial number is in the list, detecting the acceptance of receiving a telephone call associated with the received serial number from the list; and in response to detecting the acceptance of receiving the telephone call, obtaining a receiving-side telephone number associated with the received serial number from the list.

9. The non-transitory computer readable medium according to claim 5, wherein the one or more instructions further cause the computer to execute:

receiving, from the receiving-side telephone set, a request for authentication of the caller during the telephone call;

providing a list including at least one receiving-side telephone number, one or more serial numbers of different callers associated with the at least one receiving-side telephone number, and notification information associated with each serial number;

determining whether or not a receiving-side telephone number of the receiving-side telephone set is in the list;

in response to determining that the receiving-side telephone number is in the list, determining whether or not the received serial number is in the list;

in response to determining that the received serial number is in the list, identifying notification information associated with the received serial number; and transmitting the notification information, as the result of the request for authentication, to the receiving-side telephone set.

* * * * *